(12) United States Patent
Wier

(10) Patent No.: US 6,213,509 B1
(45) Date of Patent: *Apr. 10, 2001

(54) BELT TENSIONER AND DEVICE FOR FASTENING THE SAME

(75) Inventor: Franz Wier, Göggingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 09/171,503

(22) PCT Filed: Apr. 23, 1997

(86) PCT No.: PCT/EP97/02076

§ 371 Date: Oct. 21, 1998

§ 102(e) Date: Oct. 21, 1998

(87) PCT Pub. No.: WO97/39922

PCT Pub. Date: Oct. 30, 1997

(30) Foreign Application Priority Data

Apr. 23, 1996 (DE) .......................... 296 07 362 U

(51) Int. Cl.[7] ................................. B60R 22/08
(52) U.S. Cl. ..................... 280/803; 280/806; 297/468
(58) Field of Search ......................... 280/801.1, 806, 280/808, 805, 803; 297/468, 483, 482, 480; 248/297.31; 60/632; 242/374

(56) References Cited

U.S. PATENT DOCUMENTS

| | | | | |
|---|---|---|---|---|
| 2,239,125 | * | 4/1941 | Summers | 24/221 |
| 3,440,602 | * | 4/1969 | Frig | 340/52 |
| 3,838,746 | * | 10/1974 | Andres | 180/82 |
| 3,888,085 | * | 6/1975 | Larsonneur | 60/635 |
| 4,422,669 | * | 12/1983 | Chiba et al. | 280/806 |
| 4,458,921 | * | 7/1984 | Chiba et al. | 280/806 |
| 5,096,224 | * | 3/1992 | Murakami et al. | 280/808 |
| 5,169,173 | * | 12/1992 | Nishizawa | 280/806 |
| 5,350,194 | * | 9/1994 | Fohl | 280/805 |
| 5,368,427 | * | 11/1994 | Pfaffinger | 411/553 |
| 5,639,120 | * | 6/1997 | Kmiec et al. | 280/806 |
| 5,887,897 | * | 3/1999 | Gill et al. | 280/806 |
| 5,927,756 | * | 7/1999 | Wier | 280/806 |

* cited by examiner

*Primary Examiner*—J. J. Swann
*Assistant Examiner*—J. Allen Shriver
(74) *Attorney, Agent, or Firm*—Tarolli, Sundheim, Covell, Tummino & Szabo L.L.P.

(57) ABSTRACT

A belt tensioner with a piston/cylinder unit and with a device for fastening the belt tensioner to the vehicle is characterized in that on the exterior of the shell surface of the cylinder (3) a thread (13) is formed, by which the cylinder (3) can be screwed into a counter-thread (15) in the vehicle.

20 Claims, 4 Drawing Sheets

BELT TENSIONER AND DEVICE FOR FASTENING THE SAME

The invention relates to a belt tensioner comprising a piston/cylinder unit, on a vehicle. More particularly, the invention relates to a device of this type which is designed as a screw connection, with a thread formed on the shell of the cylinder and with a counter-thread provided on a part fixed to the vehicle, onto which counter-thread the cylinder is screwed.

Hitherto, belt tensioners were fastened to the vehicle for example by the provision of a flange welded to the cylinder. The flange is screwed to a counter-flange on the vehicle side. Irrespective of whether the flange is arranged laterally or on the end face of the cylinder facing away from the belt engaging means, this type of fastening increases the space required in the vehicle for the installation of the cylinder. In addition, the usual welding on of the fastening flange makes the manufacture of the belt tensioner more expensive.

From FR-A-2 239 870 a belt tensioner comprising a cylinder is known, which is provided with an external thread at its lower end and can be screwed into a receiving cup. This receiving cup has on its rear side a receiving lug provided with a port, by which lug the belt tensioner can be pivotally fastened to the vehicle. However, due to this receiving cup, the belt tensioner has a relatively long structural dimension.

The same drawback is exhibited by the belt tensioner disclosed in FR-A-2 213 231, in which the device for fastening the belt tensioner is likewise comprised of an external thread on the outside of the shell of the cylinder and a receiving cup having a female thread. This receiving cup is secured to the vehicle via a fastening flange.

The invention provides a device for fastening the belt tensioner, which has a short axial overall length, is designed as a screw connection, and with the aid of which the belt tensioner can be installed easily and quickly in the vehicle. In addition, the device according to the invention can be manufactured at low cost. This is achieved in a belt tensioner of the type initially mentioned in that the counter-thread is provided in a depression in the vehicle floor. The thread may be provided on the exterior or interior of the shell of the cylinder or the thread and may be screwed onto a counter-thread. Receiving cups or intermediate flanges the provision of which was still common in the prior art mentioned above can be dispensed with in the device according to the invention, which allows a very low-cost manufacture of the entire fastening device.

The fastening by means of screws or bolts which was usual hitherto is dispensed with, likewise the provision of flanges on the vehicle which serve for the fastening of the belt tensioner. Therefore, fewer individual parts are necessary, which reduces the expenditure with regard to manufacture and installation and also the weight. A further possibility for achieving these advantages consists in designing the device according to the invention as a bayonet closure, including at least one tongue protruding laterally on the exterior of the shell of the cylinder and a bayonet fitting which is provided on a part fixed to the vehicle and into which the cylinder can be screwed.

Finally, the invention provides a belt tensioner comprising a piston/cylinder unit, which is fastened to the vehicle using a bayonet closure, by at least one tongue protruding radially from the exterior of the shell surface of the cylinder, the tongue being part of the bayonet closure for fastening the belt tensioner to the vehicle.

The device according to the invention, with the thread, and the device according to the invention, with the radially protruding tongue on the exterior of the cylinder, have in common the idea that the outer contour of the cylinder already serves as part of the fastening device and thereby fewer individual parts are required for the fastening of the belt tensioner than is the case hitherto. Thereby, the belt tensioner as a whole can be constructed smaller, which facilitates its being accommodated in the vehicle.

According to a preferred embodiment, the thread extends over the entire shell surface of the cylinder.

In addition, a locking member against rotation can be provided, which prevents rotation of the belt tensioner after it has been fastened in the vehicle. Such a locking member preventing rotation can, for example, be a coating of the thread on the cylinder, a counter-nut or another conventional nut lock.

DESCRIPTION OF THE DRAWINGS

Further features and advantages of the invention will be apparent from the following description and from the following drawings, to which reference is made. In the drawings:

FIG. 1 shows a side view of a first embodiment of the belt tensioner according to the invention in installed state with the fastening device according to the invention in accordance with a first embodiment, the belt tensioner being equipped with a protective cap at the lower end;

FIG. 1 shows a belt tensioner in the form of a linear buckle tensioner. The belt tensioner comprises a piston/cylinder unit, of which only the cylinder 3 can be seen. A belt buckle 5 as belt engaging device is connected with the piston by a traction transfer means 7 in the form of a cable. The cylinder 3 has two axial ends, namely an end 9 facing the belt buckle 5 and a lower end 11 facing away therefrom. On the exterior of the shell surface of the cylinder 3 a thread 13 is formed as the first part of a fastening device, by which the cylinder 3 can be screwed into a counter-thread 15 as second part of a fastening device, the counter-thread 15 being provided in a port which is provided in the vehicle floor. As the thread 13 extends over the entire shell surface of the cylinder 3, the belt tensioner can be screwed to a greater or lesser depth into the vehicle floor 17. With this device for fastening the belt tensioner, only a small structural space is required inside the vehicle to accommodate the belt tensioner.

The cylinder 3 projects by its lower end 11 downwards out from the opening in the vehicle floor 17. A protective cap 19 screwed onto the end 11 prevents damage to the cylinder 3 by influences such as broken stones or corrosion.

As the end face of the cylinder 3 is open at the lower end 11, the protective cap 19 is torn away from the cylinder 3 during the tensioning process. This can take place on the one hand through the gas volume which is displaced by the piston or through direct contact of the piston with the protective cap 19.

Figure 2:
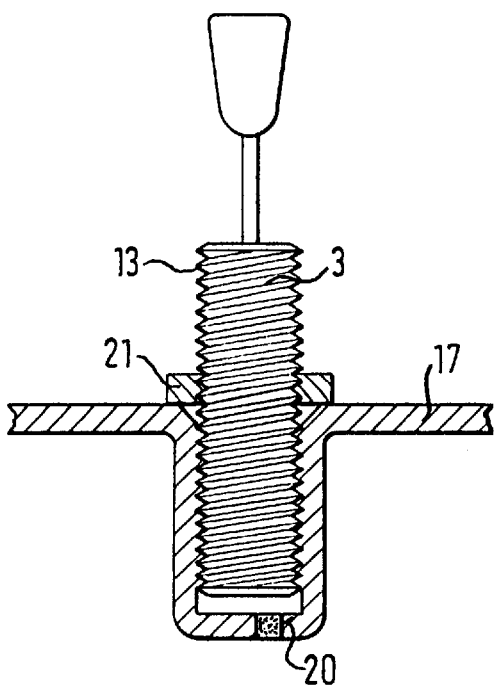
FIG. 2 shows the belt tensioner shown in FIG. 1, without protective cap, and shows the device in accordance with the invention according to FIG. 1.

In the embodiment illustrated in FIG. 2, the protective cap 19 is not necessary because the vehicle floor 17 does not have a port but rather a downwardly closed depression into which the cylinder 3 projects, so that the cylinder is protected towards the exterior. A locking member 21, preventing rotation, in the form of a counter-nut secures the axial and radial position of the belt tensioner. A ventilation opening 20 on the base of the depression is closed by an elastic sealing material which is removed due to the gas pressure when the belt tensioner is actuated and which exposes the ventilation opening 20.

Figure 3:
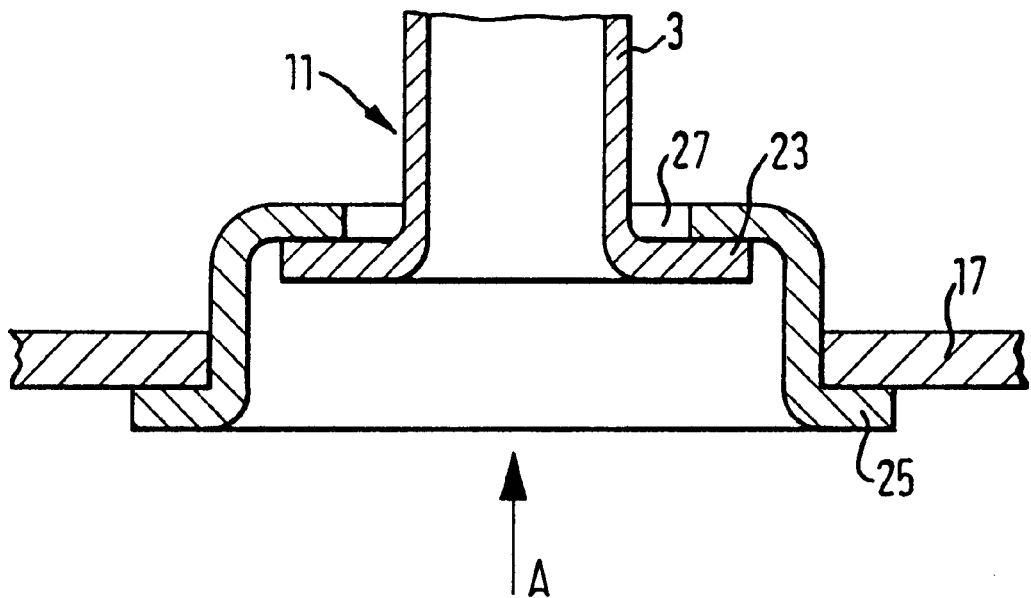
FIG. 3 shows the lower end of a belt tensioner according to the invention in installed state, which is arrested on the vehicle floor by a bayonet closure as second embodiment of the fastening device according to the invention.
Figure 4:
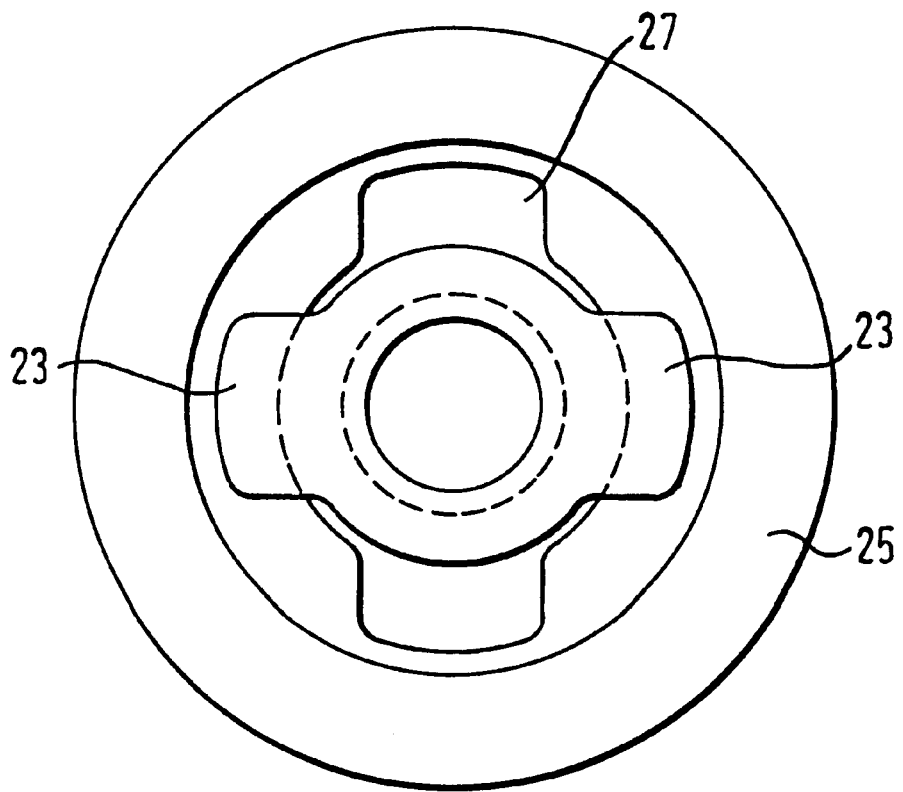
FIG. 4 shows a view of the mounted belt tensioner and of the fastening device in the direction of the arrow A in FIG. 3.

In the embodiment of the belt tensioner shown in FIG. 3, it has at its lower end 11 two opposing, radially protruding tongues 23 which serve for fastening the belt tensioner in an opening in the vehicle floor 17 and are part of a second embodiment of a fastening device. A cup-like part 25, belonging to the fastening device and having a recess 27, is pressed into this opening. The recess 27 has a contour which is adapted to the outer contour of the cylinder 3 and the tongues 23 and which permits an insertion of the cylinder 3 from above and, after turning the cylinder through 90φ, prevents the cylinder 3 from being drawn out. This type of fastening of the cylinder 3 represents a bayonet closure, so that the cylinder 3 can be fastened quickly in the vehicle floor. The tongues 23 are formed by lateral bending of the cylinder wall, which permits a favourably-priced manufacture. The part 25, which forms a bayonet fitting, can also be closed towards the bottom by a wall which serves at the same time as a support for the tongues 23. In addition, for example also a detent device can be provided which serves as a lock against rotation, as is usual in bayonet closures.

Figure 5:
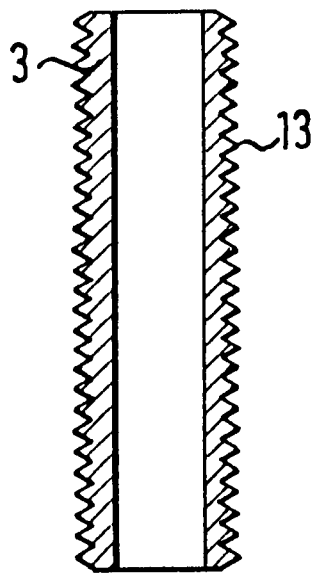
FIG. 5 shows a longitudinal sectional view through the cylinder of the belt tensioner according to the invention and of a third embodiment of the fastening device according to the invention.
Figure 5:
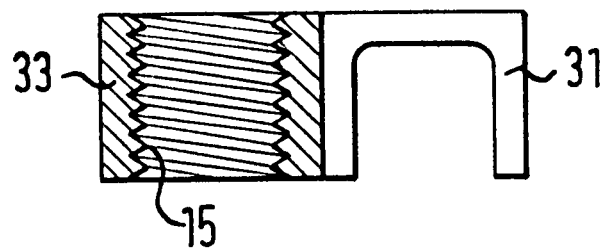
Figure 6:
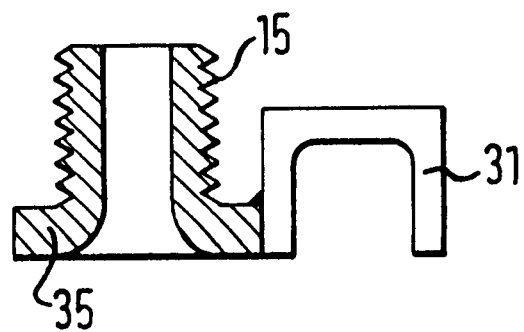
FIG. 6 shows a longitudinal sectional view through a screw with an external thread, which screw is fastened to a seat bar and is part of a fastening device according to a fourth embodiment.

By the provision of the external thread or of the bayonet closure, the belt tensioner shown can also be fastened in a space-saving manner to a vehicle seat and in particular to the rear seat bench in the vicinity of its anchoring, by a nut 33 (FIG. 5) or a screw 35 (FIG. 6) for example being welded to the seat bar 31, which permits a simple, quick fastening of the belt tensioner. In the embodiment shown in FIG. 6, the cylinder which is to be screwed onto the sleeve-shaped screw 35 has an open lower end wall and an internal thread.

Figure 1:
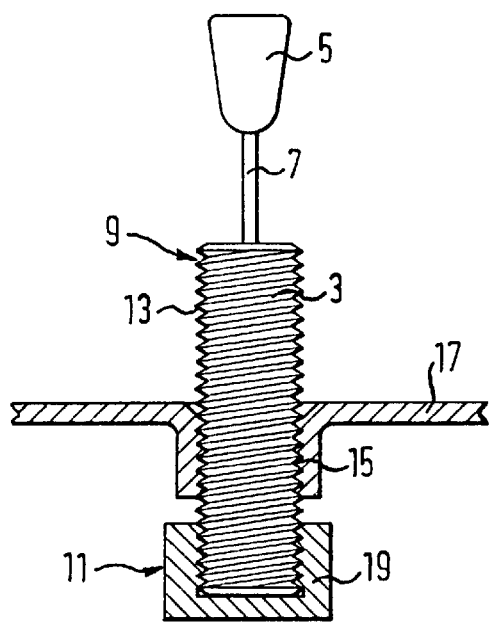
FIG. 1 shows a side view of a first embodiment of the belt tensioner in installed state with the fastening device according to the invention in accordance with a first embodiment.
Figure 7:
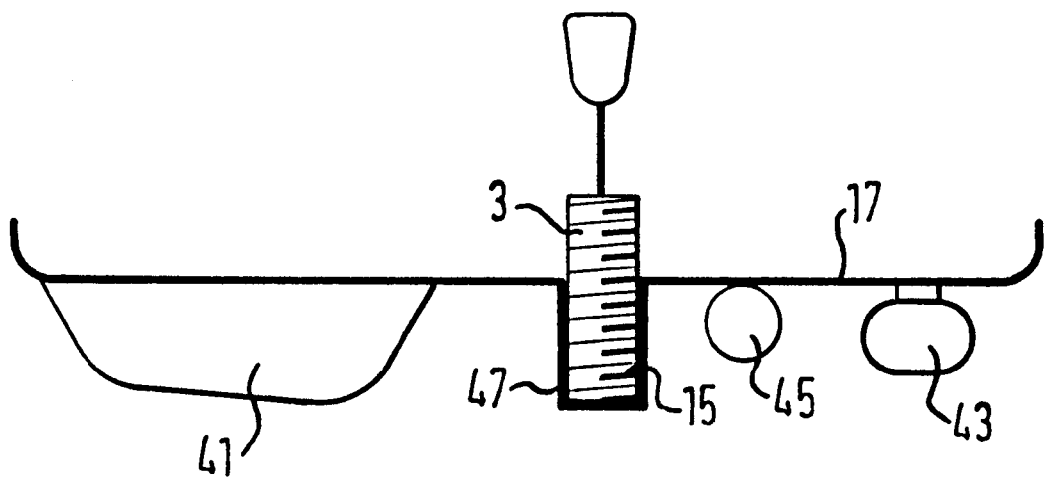
FIG. 7 shows a sectional view through a vehicle floor with a belt tensioner fastened thereto.

FIG. 7 illustrates at which point the device for fastening the belt tensioner is most favourably arranged. Vehicle floor sections, e.g. for the vehicle tank 41 project downwards from the underside of the vehicle floor 17. In addition, vehicle parts such as the exhaust 43 and Cardan shaft 45 are provided, arranged beneath the vehicle floor. The fastening for the belt tensioner should be provided between one or more of such protruding vehicle floor sections and vehicle parts. An advantageous position for the depression 47 which is provided with the counter-thread as a part of the device for fastening the belt tensioner, is between the tank 41, the Cardan shaft 45 and the exhaust 43. Furthermore, the tank 41 can be arranged for example around the depression 47. This arrangement of the device for fastening the belt tensioner is also particularly advantageous for the embodiment illustrated in FIG. 1, when the cylinder 3 is not completely surrounded by the protective cap 19, because the tank 41, cardan shaft 45 and exhaust 43 protect the cylinder 3 towards the exterior.

What is claimed is:

1. A device for fastening a belt tensioner, which comprises a piston/cylinder unit, to a vehicle, the device being configured as a screw connection, with a thread (13) formed on the shell of the cylinder (3) and with a counter-thread (15) provided on a part fixed to the vehicle, to which counter-thread (15) the cylinder (3) is screwed, characterized in that the counter-thread (13) is provided in a depression in the vehicle floor (17).

2. The device according to claim 1, characterized in that the thread (13) is formed on one of the exterior and of the shell of the cylinder (3).

3. The device according to claim 1, characterized in that the depression has a ventilation opening (20).

4. The device according to claim 3, characterized in that the ventilation opening (20) is sealed and is only exposed in the case of restraint.

5. The device according to claim 1, characterized in that the entire depression is a port in the vehicle floor (17).

6. The device according to claim 1, characterized in that the thread (13) extends over the entire exterior of the shell of the cylinder (3).

7. The device according to claim 1, characterized in that a locking member (21) against rotation is provided, which prevents rotation of the belt tensioner after its having been fastened in the vehicle.

8. The device according to claim 1, characterized in that the counter-thread is arranged on the vehicle floor between downwardly protruding vehicle floor sections.

9. A device for fastening a belt tensioner, which has a piston/cylinder unit, to a vehicle, characterized in that the device is designed as a bayonet closure, with at least one tongue (23) protruding laterally on the exterior of the shell of the cylinder (3), and with a bayonet fitting (27) provided on a part fixed to the vehicle, into which fitting (27) the cylinder (3) can be screwed.

10. The device according to claim 9, characterized in that the bayonet fitting is provided in a depression in the vehicle floor (17).

11. The device according to claim 10, characterized in that the depression is a port in the vehicle floor (17).

12. The device according to claim 10, characterized in that the bayonet fitting is constructed in a cup-shaped part (25) which is fastened in the depression.

13. The device according to claim 9, characterized in that the bayonet fitting is provided on the frame of a rear seat bench.

14. The device according to claim 9, characterized in that the bayonet fitting is arranged on the vehicle floor between downwardly protruding vehicle floor sections.

15. A belt tensioner with a piston/cylinder unit, which is adapted to be fastened to the vehicle by means of a device according to claim 9, characterized in that at least one tongue (23) protrudes radially from the exterior of the shell surface of the cylinder (3), which tongue (23) is part of the bayonet closure for fastening the belt tensioner to the vehicle.

16. The belt tensioner according to claim 15, characterized in that the tongue (23) is formed integrally with the cylinder (3).

17. The belt tensioner according to claim 12, characterized in that the cylinder (3) is open on the end face at the lower end (11) in installed state, and the tongue (23) is formed by bending the cylinder wall.

18. The device according to claim 1, characterized in that the thread (13) is formed on the interior of the shell of the cylinder.

19. The device according to claim 1, characterized in that the counter-thread is arranged on the vehicle floor between vehicle parts provided beneath the vehicle floor.

20. The device according to claim 9, characterized in that a counter-thread is arranged on the vehicle floor between vehicle parts provided beneath the vehicle floor.

* * * * *